May 21, 1935.  W. O. BECHMAN  2,002,285
DRIVING DISK FOR CLUTCHES
Filed Dec. 18, 1931   2 Sheets-Sheet 2
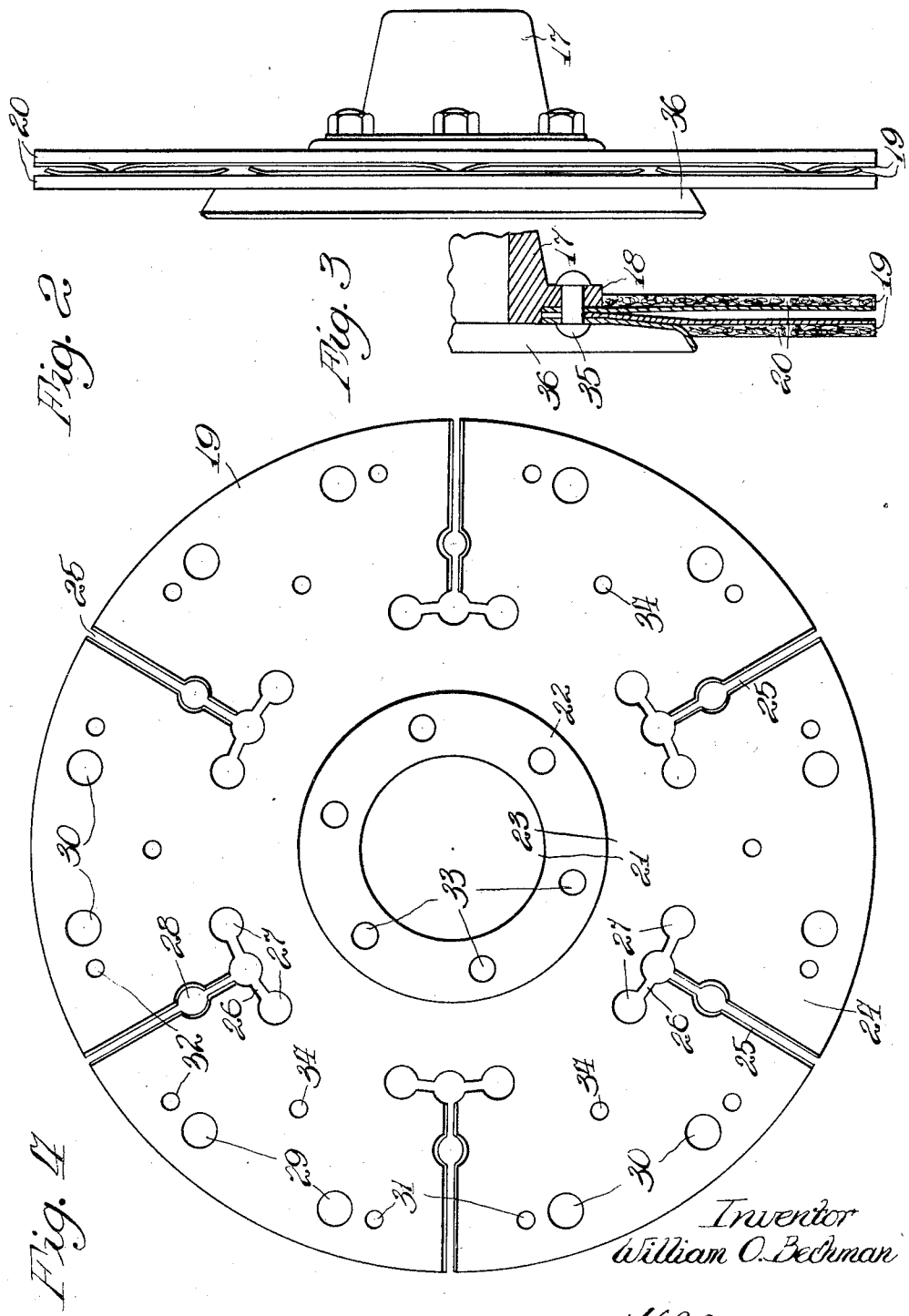

Patented May 21, 1935

2,002,285

UNITED STATES PATENT OFFICE 2,002,285

DRIVING DISK FOR CLUTCHES

William Otto Bechman, Chicago, Ill., assignor to International Harvester Company, a corporation of New Jersey Application December 18, 1931, Serial No. 581,848

4 Claims. (Cl. 192—107)

The present invention relates to clutches.

More particularly it relates to an improved form of driving disk for clutches.

The grabbing of clutch plates is a common objection and such action, in addition to imposing severe stresses on the mechanism, produces chattering and highly uncomfortable operation in motor vehicles. To overcome this difficulty various types of resilient or flexible clutch plates have been devised to secure smoother engagement.

The principal object of the present invention is to provide an improved clutch which can be smoothly engaged. A more specific object is to provide an improved, resilient clutch plate construction. Another object is to provide a clutch plate assembly made up of two exactly similar elements, whereby manufacture and service are simplified.

These and other objects which will be apparent, are accomplished by a clutch and a clutch plate construction as shown in the drawings, in which:

Figure 2 is an elevation of the clutch plate assembly;

Figure 3 is a sectional view taken on a radius through the assembly shown in Figure 2; and Figure 4 is a plan view of one of the flexible driving disks utilized in the device of the invention.

Figure 1:
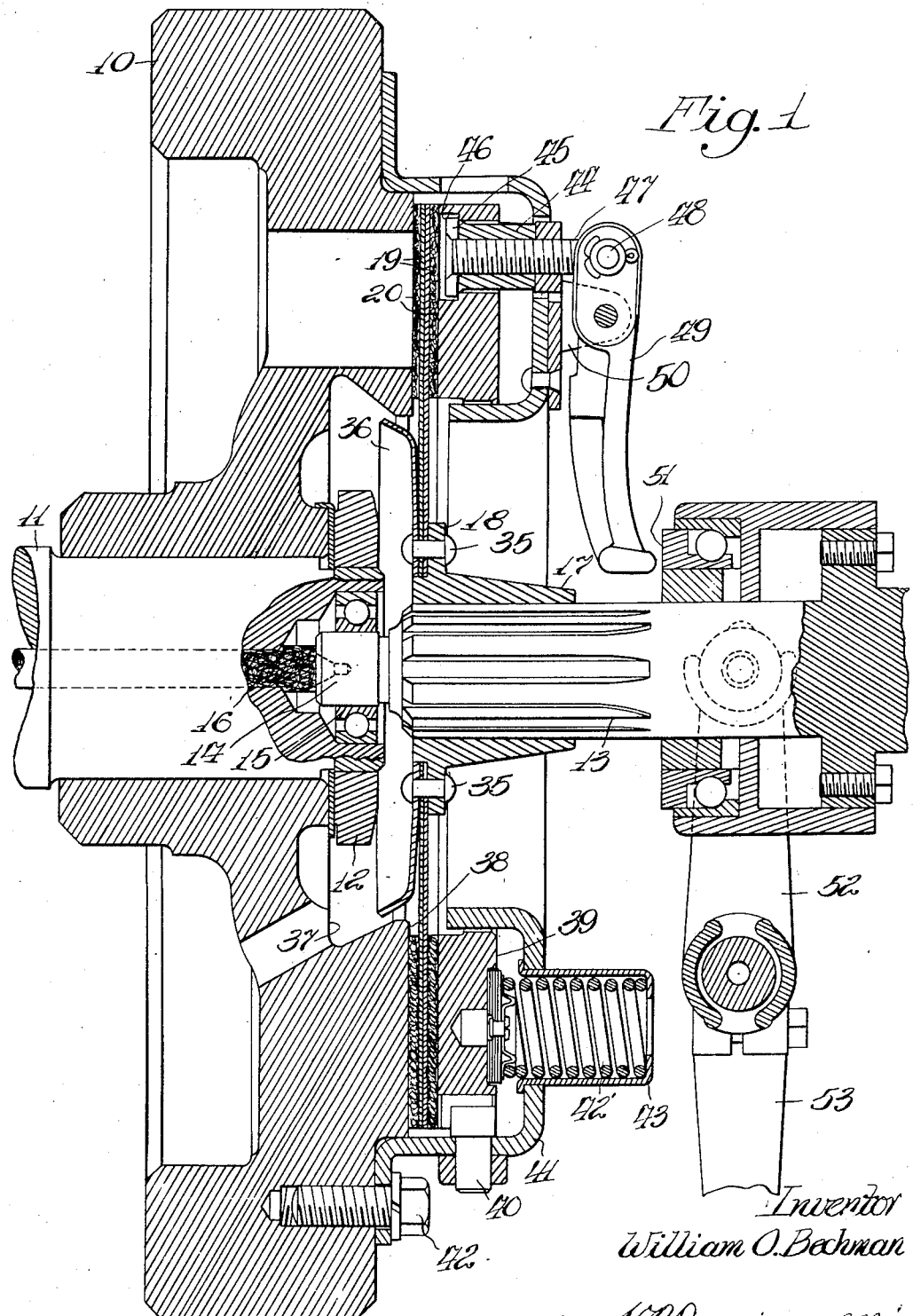
Figure 1 is a sectional view of a clutch assembly and operating means therefor, embodying the invention.

In Figure 1 a fly wheel 10 of a conventional construction is shown, mounted on the end of a crank shaft 11, as used in the conventional internal combustion engine. The fly wheel is secured to said shaft by a nut 12 and other means not shown in detail. A shaft 13, which is the main shaft of a transmission as ordinarily used in an automotive vehicle, is provided with an integral end portion 14 of reduced diameter. The end portion 14 is mounted in a ball bearing assembly 15 in the end of the crank shaft 11, to maintain axial alignment of the shaft 13 with the crank shaft. A cored passage 16, filled with felt, is adapted to communicate with the oiling system of the engine for supplying lubrication to the bearing assembly 15. A hub 17 is slidably splined on the end of the shaft 13. Said hub is provided with an annular flange 18, to which the clutch plate assembly, embodying the invention, is secured. The clutch plate assembly is made up of two disks 19, to which annular elements 20 of contacting material are secured. Each disk 19 has a central opening 21, which fits over the hub 17. An annular inner portion 22 of the disk is formed in a plane perpendicular to the axis of the disk. Outwardly from the portion 22 an intermediate portion 23 of the disk is slightly tapered to form a conical surface. Outwardly from the portion 23 the remaining annular portion 24 of the disk is formed in a plane perpendicular to the axis of the disk. The outer portion 24 of the disk is formed with a plurality of radially extending slots 25 evenly spaced at 60° intervals around the disk. Said slots 25 extend through the outer annular portion into the intermediate conical portion of the disk. At the inner end of each slot 25 a circumferentially extending cross slot 26 is positioned substantially at right angles to the slot 25. The ends of the slots 26 are formed as enlarged circles 27 to prevent the starting of cracks outwardly through the metal upon severe stresses. Intermediate the ends of the slots 25 enlarged openings 28 are formed to provide spaces for the rivet heads on the adjoining plate. Large openings 29 and 30 are also provided to provide a space for rivets extending through the openings 31 and 32. Around the center annular portion 22 a plurality of openings 33 are arranged 15° away from the slots 25.

Before the disks are assembled to form the clutch plate, the facing or contact material 20 is securely riveted to the disk. The material 20 is in the form of a continuous annular element of a substantial thickness and of a radial width corresponding substantially to the width of the outer annular portions 24 of the disks. Said elements are secured to the disks 19 in the usual manner by rivets extending through the openings 31, 32 and 33. The clutch elements 20 are secured to the disks on the sides opposite the direction of extension of the conical portions 23. The edges of the disks adjacent the slots 25, are slightly bent, as shown in Figure 2, in the same direction as the direction of extension of the conical portion 23. The disks are comparatively thin and are made up of steel sheets of a resilient nature which may be heat treated after being stamped out with all the slots and perforations hereinbefore described.

In assembling the disks to form a clutch plate assembly, two disks with the clutch elements 20 attached thereto, are secured together on the hub 17 by rivets 35 extending through the openings 33 in the disk and through openings formed in the flange 18 on the hub. The disks are assembled with the conical portions of each disk extending toward each other, whereby the annular portions 22 will lie flat against each other, as shown in Figure 1. To assemble one element is, therefore, reversed with respect to the other. The elements are also rotated relative to each other with the slots 25 of one disk lying between the slots 25 of the other disk. By positioning the holes 33 15° away from the slots 25 and by reversing one disk and rotating it 60° with respect to the other disk, the holes 33 of the two disks come into alignment. This feature is of substantial value in manufacture and service, as only one type of disk is necessary to form the clutch plate assembly. It will also be understood that by attaching the disk, as above set forth, the bent-over portions of the disks adjacent the slots 25 project inwardly toward the adjacent plate, as shown in Figure 2.

To securely hold the plates against the flange 18 of the hub 17, an annular member 36, having openings aligned with the openings 33, is also secured against the disks by the rivets 35. Beyond the rivets 35 the member 36 is slightly tapered away from the disk to allow room for the taper of the adjacent disk. The outer edge of the member 36 is flanged to provide means for throwing oil and grease delivered thereto, outwardly into a recess 37 formed in the fly wheel, whereby said material does not reach the clutch plate assembly. The radial face of the fly wheel 38 is finished to provide a clutch engaging surface for mating with the clutch elements 20 adjacent thereto. On the other side of the clutch plate assembly an annular contact member 39 is provided, said member being held against rotation by studs 40 fitted into recesses formed in the periphery of the member 39. The studs 40 are securely fastened to a cover plate 41. Said plate has a drum portion, an outwardly extending flange secured to the fly wheel 10 by cap screws 42, and an inwardly extending portion. The inwardly extending portion of the cover plate 41 has an annular radial face which provides means for mounting the clutch engaging and disengaging elements. This part of the clutch, as shown, is of a conventional construction. A plurality of heavy springs 42' mounted in retaining cups 43 are positioned to press axially against the member 39 and to thereby engage said member with the clutch element 20 at its side of the clutch plate assembly and to engage the element 20 at the other side thereof with the surface 38 formed on the fly wheel. There is a plurality of these springs arranged around the cover plate 41 at equally spaced intervals. To disengage the clutch there is a plurality of actuating means, one of which is shown. A cylindrical element 44, having an enlarged head portion 45, extends through an opening 46, formed in the member 39 with the head 45 engaging a shoulder formed by an increased diameter of the opening 46. An element 47 threaded into the member 44, has an angled end portion 48 extending through an opening formed in the end of the actuating link 49. Said link is pivoted radially inwardly from the end at which the element 47 is attached on a bracket 50. The bracket 50 is secured to the cover plate 41 on its radial face. The lever 49 extends radially inwardly to a point adjacent the shaft 13. The axially slidable thrust member 51, movable by a clutch actuating fork 52, is operative to press the levers 49, it being understood that there is a plurality of said levers arranged at equally spaced distances around the cover plate 41. The clutch collar 52 is operable by a shifting lever 53. This part of the clutch is of a conventional construction and is not a part of this invention, it being shown merely to illustrate an embodiment of the invention.

In the operation of this device, as described, when the clutch is in a non-engaging position, the two disks are maintained apart, as shown in Figure 2, with the bent-over portions extending inwardly toward the adjacent plate. When the clutch is engaged the pressure of the springs 42' tends to push the disks axially toward each other, the resilient bent-over portions of the disks resiliently opposing the action of the springs 42' whereby pressure is gently applied to the engaging faces of the clutch plate assembly. As the outer portions 24 of the disks are parallel in non-engaging position, the initial contact of the clutch elements 20 with the engaging surfaces is over the complete area of the engaging surfaces. This is a particular advantage of this construction. As the pressure increases, the resilient bent-over portions are forced back and the two disks are brought into engagement, as shown in Figure 1.

It is to be understood that applicant has shown only a preferred embodiment of his improved clutch and that he claims as his invention all modifications falling within the scope of the appended claims.

What is claimed is:

1. A clutch assembly comprising two resilient disks secured in fixed position relative to each other with their peripheral portions in spaced relationship, each of said disks being formed with spaced radial slots extending inwardly from the periphery, the slots in one disk alternating with the slots in the other disk, the edge portions of one of the disks being turned inwardly adjacent the slots toward the adjacent disk, and contact elements secured to the outer sides of said disks.

2. A clutch plate assembly comprising a pair of disks secured together at the center, said disks being formed with parallel annular peripheral portions positioned in spaced relation with respect to each other, inwardly extending radial slots formed around said disks the slots in one disk being staggered with respect to the slots in the other disk, the portions of the disks adjacent the slots being bent inwardly toward the adjacent disk, and unbroken annular contact elements secured to the outer sides of the peripheral portions of the disks.

3. A clutch plate assembly comprising a pair of disks of resilient material secured together, said disks being formed with parallel annular outer portions, annular center portions rigidly secured together, and conical intermediate portions, whereby when the disks are secured together with the conical portions extending inwardly the outer portions are spaced apart, radial slots extending inwardly from the peripheries of the disks, the portions of the disks adjacent the slots being bent inwardly, and unbroken annular contact elements secured to the outer sides of the outer annular portions of the plates.

4. A clutch plate assembly comprising a pair of identical disks of resilient material secured together with one of the disks reversed with respect to the other, said disks being formed with parallel annular outer portions, annular center portions rigidly secured together and conical intermediate portions, whereby when the disks are secured together with the conical portions extending inwardly the outer portions are spaced apart, radial slots extending inwardly from the periphery of the disks, said slots being positioned alternately in the two disks, the portions of the plates adjacent the slots being bent inwardly, and unbroken annular contact elements secured to the outer sides of the outer annular portions of the disks.

WILLIAM OTTO BECHMAN.